G. C. ALLISON.
DEMOUNTABLE TIRE RIM.
APPLICATION FILED MAY 13, 1916.
1,205,958.
Patented Nov. 28, 1916.
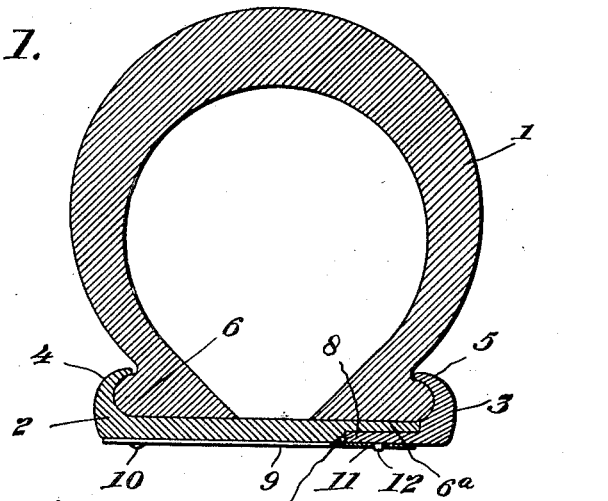
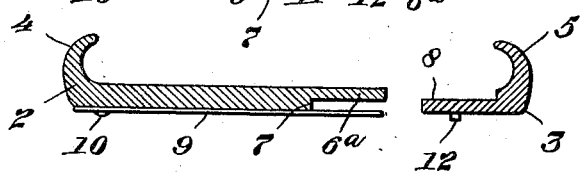
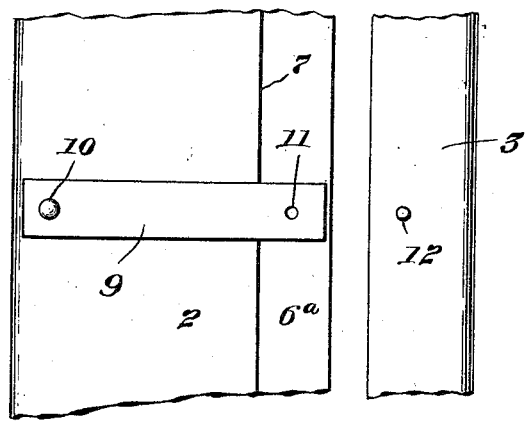
Witness
J. H. Bishop
Inventor
Grover C. Allison.
By
J. W. Bond
Attorney

UNITED STATES PATENT OFFICE.

GROVER C. ALLISON, OF CANTON, OHIO.

DEMOUNTABLE TIRE-RIM.

1,205,958.  Specification of Letters Patent.  Patented Nov. 28, 1916.

Application filed May 13, 1916. Serial No. 97,273.

*To all whom it may concern:*

Be it known that I, GROVER C. ALLISON, a citizen of the United States, residing at Canton, in the county of Stark and State of Ohio, have invented a new and useful Demountable Tire-Rim, of which the following is a specification.

My invention relates to improvements in automobile wheel rims and has more especial reference to demountable tire rims.

The object of my invention is to provide means whereby a tire may be readily removed from or replaced upon a wheel rim without damaging the tire.

A further object is to provide a demountable tire rim which will be inexpensive in construction and efficient in use and may be quickly and readily applied to or removed from a tire.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim without departing from the spirit or sacrificing any of the advantages of the invention.

In the accompanying drawing: Figure 1 is a section through a tire provided with my improved rim. Fig. 2 is a section through the rim showing the two sections disassembled. Fig. 3 is a bottom plan view of the same.

Similar numerals of reference indicate corresponding parts throughout all the figures of the drawing.

Referring more especially to the construction illustrated in the accompanying drawings, the numeral 1 indicates the casing of a pneumatic tire of the usual construction, the numeral 2 the larger section of the demountable rim and the numeral 3 the smaller section thereof. The sections 2 and 3 are annular and are provided with the usual curved flange portions 4 and 5 adapted to clench the base portion 6 of the tire. The member 2 is provided at its inner extremity with the reduced portion 6ª, a shoulder 7 adapted to be abutted by the inner extremity of the reduced portion 8 of the member 3. The member 2 is provided at intervals around its inner surface with leaf springs 9 which are connected near the outer edge of the member 2 with a rivet or its equivalent 10, an aperture 11 being formed near the other extremity of the spring to receive a stud 12 carried by the member 3.

When it is necessary to remove the tire from the rim for any purpose the leaf springs 9 may be moved out of engagement with the studs 12 and the member 3 moved away from the member 2 and out of engagement with the tire. When it is desired to assemble the parts the member 3 may be easily replaced after the tire has been placed in position upon the member 2 and the springs engaged with the studs 12 thus holding the rim firmly upon the tire. It will be seen that by thus providing the member 2 of sufficient width to extend across the base of the tire case, the joint between the members 2 and 3 is located at one edge of the casing, thereby preventing any possibility of the inner tube of the tire from being pinched or cut in the joint between the rim members.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claim.

I claim:

A demountable rim comprising an annular member adapted to extend across the base of a tire casing, a curved flange at one edge of said annular member adapted to engage the tire casing, a reduced shouldered portion provided at the other edge of said member, a second comparatively narrow annular member provided with a reduced portion adapted to engage the reduced portion of said first named member and with a curved flange adapted to engage the other edge of the tire casing, said narrow member provided with a shoulder arranged to abut against the inner edge of said first named annular member, the joint thus formed being located adjacent the edge of the base of the tire casing, a plurality of leaf springs connected at one extremity to the inner face of said first named member and extending across the reduced portion thereof, each of said springs provided with an aperture adjacent said reduced portion and studs carried upon the inner surface of said second named member and adapted to engage the apertures in said springs.

In testimony that I claim the above, I have hereunto subscribed my name.

GROVER C. ALLISON.